(12) United States Patent
Chen

(10) Patent No.: US 6,678,418 B2
(45) Date of Patent: Jan. 13, 2004

(54) METHOD AND APPARATUS FOR BUFFER MANAGEMENT IN VIDEO PROCESSING

(75) Inventor: George K. Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 09/978,924

(22) Filed: Oct. 18, 2001

(65) Prior Publication Data

US 2002/0075960 A1 Jun. 20, 2002

Related U.S. Application Data

(63) Continuation of application No. 09/216,722, filed on Dec. 21, 1998, now Pat. No. 6,330,366.

(51) Int. Cl.⁷ .................................................. G06K 9/36
(52) U.S. Cl. ...................................................... 382/236
(58) Field of Search ................................ 382/232, 236, 382/238, 239, 240, 242, 248, 250; 348/384.1, 394.1, 395.1, 400.1–404.1, 407.1–416.1, 420.1, 421.1, 425.2, 430.1, 431.1, 584.1, 591.1, 699.1, 700.1

(56) References Cited

U.S. PATENT DOCUMENTS

| | | | | |
|---|---|---|---|---|
| 4,868,653 A | * | 9/1989 | Golin et al. | 375/240.023 |
| 5,247,363 A | * | 9/1993 | Sun et al. | 348/616 |
| 5,267,334 A | | 11/1993 | Normille et al. | |
| 5,436,672 A | | 7/1995 | Medioni et al. | |
| 5,440,345 A | | 8/1995 | Shimoda | |
| 5,442,400 A | * | 8/1995 | Sun et al. | 375/240.15 |
| 5,455,629 A | * | 10/1995 | Sun et al. | 375/240.27 |
| 5,565,920 A | * | 10/1996 | Lee et al. | 348/398 |
| 5,586,264 A | * | 12/1996 | Belknap et al. | 395/200.08 |
| 5,589,829 A | * | 12/1996 | Astle | 341/67 |
| 5,646,618 A | | 7/1997 | Walsh | |
| 5,651,002 A | * | 7/1997 | Van Seters et al. | 370/392 |
| 5,686,963 A | * | 11/1997 | Uz et al. | 348/404 |
| 5,778,190 A | | 7/1998 | Agarwal | |
| 5,796,434 A | | 8/1998 | Lempel | |
| 5,812,699 A | * | 9/1998 | Zhu et al. | 382/232 |
| 6,101,276 A | * | 8/2000 | Adiletta et al. | 382/236 |
| 6,104,441 A | * | 8/2000 | Wee et al. | 348/404 |
| 6,185,640 B1 | * | 2/2001 | Ross | 710/53 |
| 6,295,094 B1 | * | 9/2001 | Cuccia | 348/559 |
| 6,330,366 B1 | * | 12/2001 | Chen | 382/236 |
| 6,363,075 B1 | * | 3/2002 | Huang et al. | 370/412 |
| 6,366,959 B1 | * | 4/2002 | Sidhu et al. | 709/231 |
| 6,374,314 B1 | * | 4/2002 | Darnell et al. | 710/52 |
| 6,463,065 B1 | * | 10/2002 | Petersen et al. | 370/412 |

* cited by examiner

*Primary Examiner*—Jose L. Couso
(74) *Attorney, Agent, or Firm*—Kenyon & Kenyon

(57) ABSTRACT

One embodiment of the invention comprises a method and apparatus for managing a plurality of buffers for a video codec. Each buffer has at least one memory storage unit. A first video frame is received. The first video frame is stored in a first memory storage unit. A second video frame is received, the second video frame having said first video frame as a reference frame. The second video frame is stored in a second memory storage unit, with the second memory storage unit being a first predetermined number of memory storage units from the first memory storage unit.

2 Claims, 4 Drawing Sheets

FRAME SEQUENCE A. K, D, P, D, ...

FRAME SEQUENCE B. K, D, P2, D, P, D ...

FRAME SEQUENCE C. K, P2, P2, P, P2 ...

METHOD AND APPARATUS FOR BUFFER MANAGEMENT IN VIDEO PROCESSING

This application is a continuation of U.S. patent application Ser. No. 09/216,722, now U.S. Pat. No. 6,330,366, filed Dec. 21, 1998, and incorporated herein by reference in its entirety.

FIELD OF THE INVENTION

The invention relates to video processing in general. More particularly, the invention relates to a method and apparatus for managing buffers used for motion estimation.

BACKGROUND OF THE INVENTION

Digital video is becoming increasingly popular because of its capability of delivering high picture quality. One problem with digital video, however, is the amount of digital data which is necessary to represent an image with high levels of detail. This in turn creates problems with storing the digital data, and transporting the digital data between individual devices (e.g., from one computer to another over a network). Consequently, various compression technologies have been developed to reduce the amount of digital data necessary to represent analog video signals, while still maintaining the high levels of quality associated with digital video.

One compression technique used to compress a video signal is referred to as motion estimation. Motion estimation is commonly utilized by video encoders in signal processing techniques that compress successive frames of digital video data ("video frames"). Motion estimation techniques exploit the temporal correlation that often exists between consecutive video frames, in which there is a tendency for objects or image features to move from one location to another on a display device from frame to frame. For example, frame 1 may contain an object, and frame 2 may contain a set of pixels corresponding to the same object spatially displaced from the location in frame 1. If frame 1 is transmitted to and received by a pixel processor or video processor (which performs any necessary decompression or other decoding), frame 2 may be transmitted without including the pixel data corresponding to the object. Instead, motion vectors (i.e., "pointers") are sent along with frame 2. These motion vectors may be utilized by the receiving video processor when decoding the received video frame 2 to reproduce the object from frame 1 at a new location within frame 2. Since such motion vectors can be represented with fewer bits than the pixels that comprise the object, fewer bits need to be transmitted (or stored) in order to recreate the object in frame 2.

Several frame types are associated with motion estimation, which varies according to the type of compression standard used for encoding the video signal. For example, the Indeo® 5.0 Real Time Encoder ("IRTE") uses a proprietary standard developed by Intel Corporation. The Indeo Video 5.0 encoder produces the following frame types: key frames (K), predicted frames (P), second level predicted frames (P2) and disposable frames (D). Each frame type can be used as a reference frame by another frame for motion estimation according to a certain hierarchy, as shown in Table 1 as follows:

TABLE 1

| FRAME TYPE: | USED AS REFERENCE FOR: |
| --- | --- |
| K | P, P2 and D frames |
| P | P, P2 and D frames |
| P2 | P2 and D frames |
| D | None |

Thus, as shown in Table 1, K and P frames can be used as reference frames for P, P2 and D type of frames. The difference between K and P frames, however, is that P frames need another reference frame to be decoded correctly, whereas a K frame is self-contained. P2 frames can be used as reference frames for other P2 and D frames. D frames are not used as reference frames for any other frame type.

Video encoders/decoders ("video codecs") using conventional motion estimation techniques, however, are unsatisfactory for a number of reasons. Most prominent is the problem of buffer management. Many video codecs utilize one or more buffers to store each frame as it is received by the codec. Each buffer has one or more memory storage units. As a video codec receives a frame, it stores the frame in a memory storage unit of one of the buffers. The buffer is managed by using at least one pointer to indicate in which memory storage unit the frame has been stored. Additional pointers may also be used to indicate the received frame's reference frame, if the received frame is other than a K frame. The algorithms used to manage these multiple pointers, however, are relatively complicated. Further, they consume a relatively large number of processing cycles, both in the encoding and decoding stage. In addition, these algorithms are generally inefficient and tend to inappropriately overwrite data within a cache, which is a problem referred to as "cache pollution" or "thrashing."

In view of the foregoing, it can be appreciated that a substantial need exists for a new video codec which solves the above-discussed problems.

SUMMARY OF THE INVENTION

One embodiment of the invention comprises a method and apparatus for managing a plurality of buffers for a video codec. Each buffer has at least one memory storage unit. A first video frame is received. The first video frame is stored in a first memory storage unit. A second video frame is received, the second video frame having said first video frame as a reference frame. The second video frame is stored in a second memory storage unit, with the second memory storage unit being a first predetermined number of memory storage units from the first memory storage unit.

DETAILED DESCRIPTION

The embodiments of the invention include a method and apparatus for managing buffers for a video codec, such as the IRTE made by Intel Corporation. In order for a video codec to perform at a high level, e.g., capture and compressed video in real time at up to 30 frames per second, requires an efficient buffer management technique. Buffering frames used for motion estimation, however, is difficult since a received frame may need a reference frame to be properly encoded or decoded. Conventional buffer management techniques use multiple pointers to keep track of where each frame and its reference frame is stored. The algorithms necessary to manipulate and maintain these pointers are complex, and therefore inefficient.

The embodiments of the invention are based on the recognition that certain video codecs, such as the IRTE, produces a finite number of frame sequences for motion estimation. By examining these frame sequences, a buffer usage sequence can be constructed which ensures that a frame is always stored a predetermined number of memory storage units from its reference frame. In the embodiments of the invention discussed herein, the predetermined number of memory storage units equals the maximum number of memory storage units in each buffer. It can be appreciated, however, that this predetermined number of memory storage units can be of any size if used consistently with the principles described herein. Since a frame is always a known number of memory storage units from its reference frame, the need for pointers for every buffer is eliminated. Rather, a pointer can be maintained for the last received frame, and if the last received frame requires a reference frame to be properly encoded or decoded, the buffer management algorithm would search for the memory storage unit holding the appropriate reference frame using the predetermined value.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
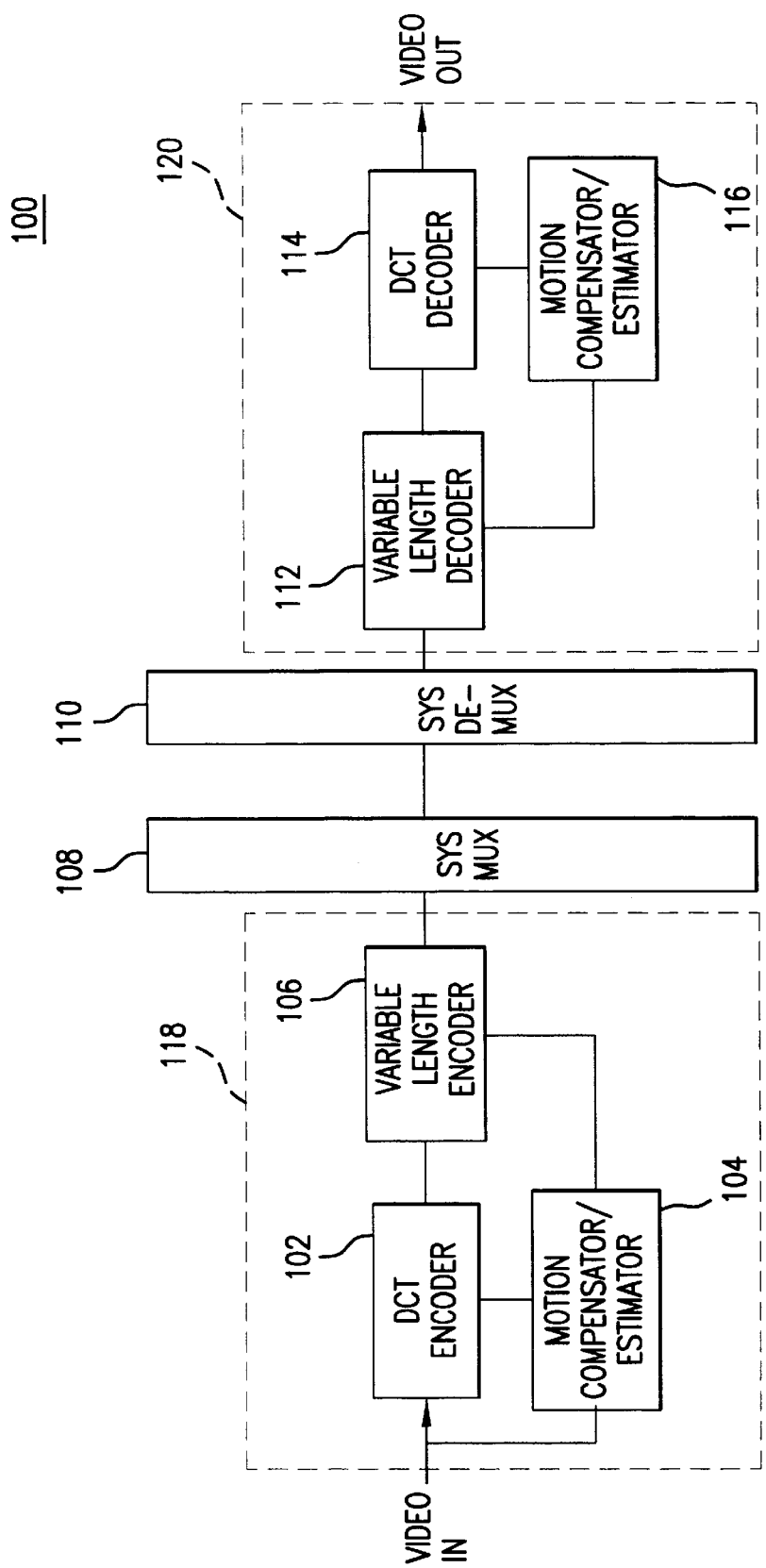
FIG. 1 is a block diagram of video codec suitable for use with one embodiment of the invention.

Referring now in detail to the drawings wherein like parts are designated by like reference numerals throughout, there is illustrated in FIG. 1 a block diagram of video codec suitable for use with one embodiment of the invention. A video codec 100 includes an encoding system 118 and a decoding system 120.

Encoding system 118 consists of a discrete cosine transform (DCT) encoder 102, a motion compensator and estimator (MCE) 104, and a variable length encoder (VLE). DCT encoder 102 exploits spatial redundancies, and the MCE 104 exploits temporal redundancies in an interlaced video signal. A coded video bitstream is sent to a system multiplexer 108, which outputs either a transport stream or a program stream.

Decoding system 120 in codec 100 consists of a variable length decoder (VLD) 112, DCT decoder 114 and a MCE 116. A system de-multiplexer 110 performs the complementary function of system multiplexer 108 and presents the video bitstream to VLD 112 for decoding of motion vectors and DCT coefficients. MCE 116 uses a motion vector decoded by VLD 112 to generate motion compensated prediction that is added back to a decoded prediction error signal to generate decoded video output.

In an advantageous embodiment, encoding system 118 and decoding system 120 of FIG. 1 are two distinct systems. In an alternative embodiment of the present invention, a single system comprising all of the different components of systems 118 and 120 may be used to encode and decode video signals. Those skilled in the art will understand that such a combined system may be used to display decoded video signals in real-time to monitor the capture and encoding of video signals.

Encoding system 118 and decoding system 120 utilize one or more buffers (not shown) to store a block of video data ("video frames") received from DCT encoder 102 or variable length decoder 112, respectively. Each buffer comprises computer-readable memory and is comprised of one or more memory storage units. Each memory storage unit is designed to store a single frame.

These buffers are managed by a buffer management algorithm (BMA) which can be executed as computer software, hardware or a combination of both. If implemented as computer software, the BMA comprises a set of computer program segments stored in memory and executed by a microprocessor. The memory may be any suitable computer readable memory device such as one or more dynamic random access memory (DRAM) devices. The processor may be any general purpose microprocessor having sufficient speed to implement the functionality described herein, such as the Pentium®, Pentium Pro, or Pentium II made by Intel Corporation. The operation of the BMA will be discussed with reference to FIGS. 2 and 3.

Figure 2:
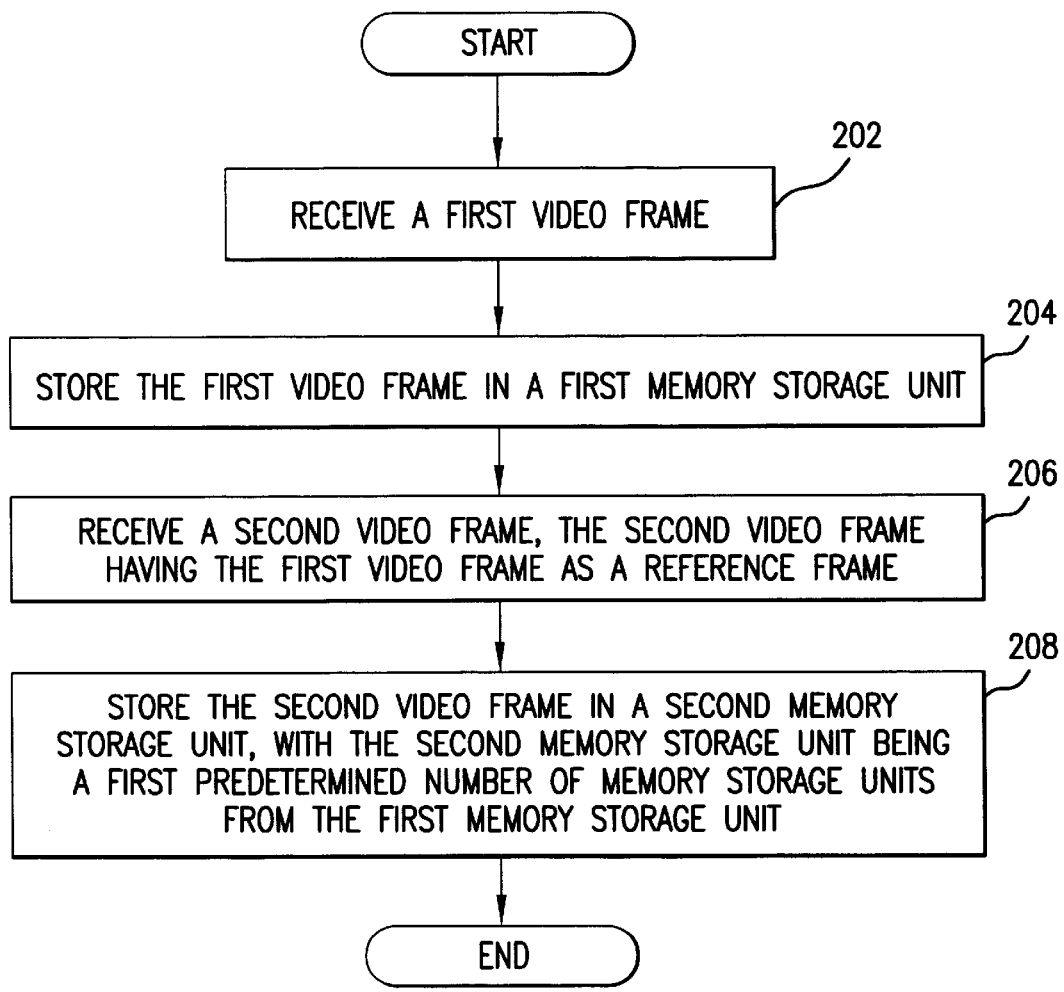
FIG. 2 is a first block flow diagram of the steps performed by the BMA in accordance with one embodiment of the invention.

FIG. 2 is a first block flow diagram of the steps performed by the BMA in accordance with one embodiment of the invention. The operation of the BMA in this embodiment of the invention will be discussed in terms of decoding system 120. It can be appreciated by one skilled in the art, however, that the principles discussed herein may be implemented in encoding system 118, and still fall within the scope of the invention.

As shown in FIG. 2, decoding system 120 receives a first video frame at step 202. The first video frame is stored in a first memory storage unit at step 204. System 120 receives a second video frame at step 206. The second video frame uses the first video frame as a reference frame if the second video frame is not a K frame. System 120 stores the second video frame in a second memory storage unit, with the second memory storage unit being a first predetermined number of memory storage units from the first memory storage unit. This assumes that the memory storage units for each buffer are treated as contiguous units, as discussed further with reference to FIG. 4.

The BMA stores video frames utilizing the following steps. In this embodiment of the invention, video codec 100 as described with reference to FIG. 1 is a IRTE capable of producing only three different types of frame sequences. The three frame sequences are as follows:

Frame Sequence A=K, D, P, D [repeat].
Frame Sequence B=K, D, P2, D, P, D [repeat].
Frame Sequence C=K, P2, P2, P, P2 [repeat].

Each frame sequence has a corresponding buffer usage sequence. The three corresponding buffer usage sequences, assuming there are four buffers, are as follows:

Buffer Usage Sequence A=0, 1, 1, 0 [repeat].
Buffer Usage Sequence B=0, 1, 1, 2, 1, 2, 2, 3 [repeat].
Buffer Usage Sequence C=0, 1, 2, 1, 2, 3 [repeat].

Each buffer usage sequence is a sequence of values representing each of the buffers used by decoding system 120. Once a particular frame sequence is determined, the corresponding buffer usage sequence is used to determine the buffers in which received video frames are stored. The buffer usage sequence ensures that frames requiring a reference frame for decoding is always plus or minus X, where X is a predetermined number of memory storage units. In this embodiment of the invention, this predetermined number equals the size of the memory buffer.

The buffer usage sequence is controlled using a state machine. The state machine keeps track of the current frame type, current frame location, previous reference frame location, and the buffer to use for the next frame. The buffers are allocated only once and repeatedly used through-out the decoding process. The starting point of the buffers are determined apriory to minimize cache thrashing. The steps used by the BMA to store video frames is described next with reference to FIG. 3.

Figure 3:
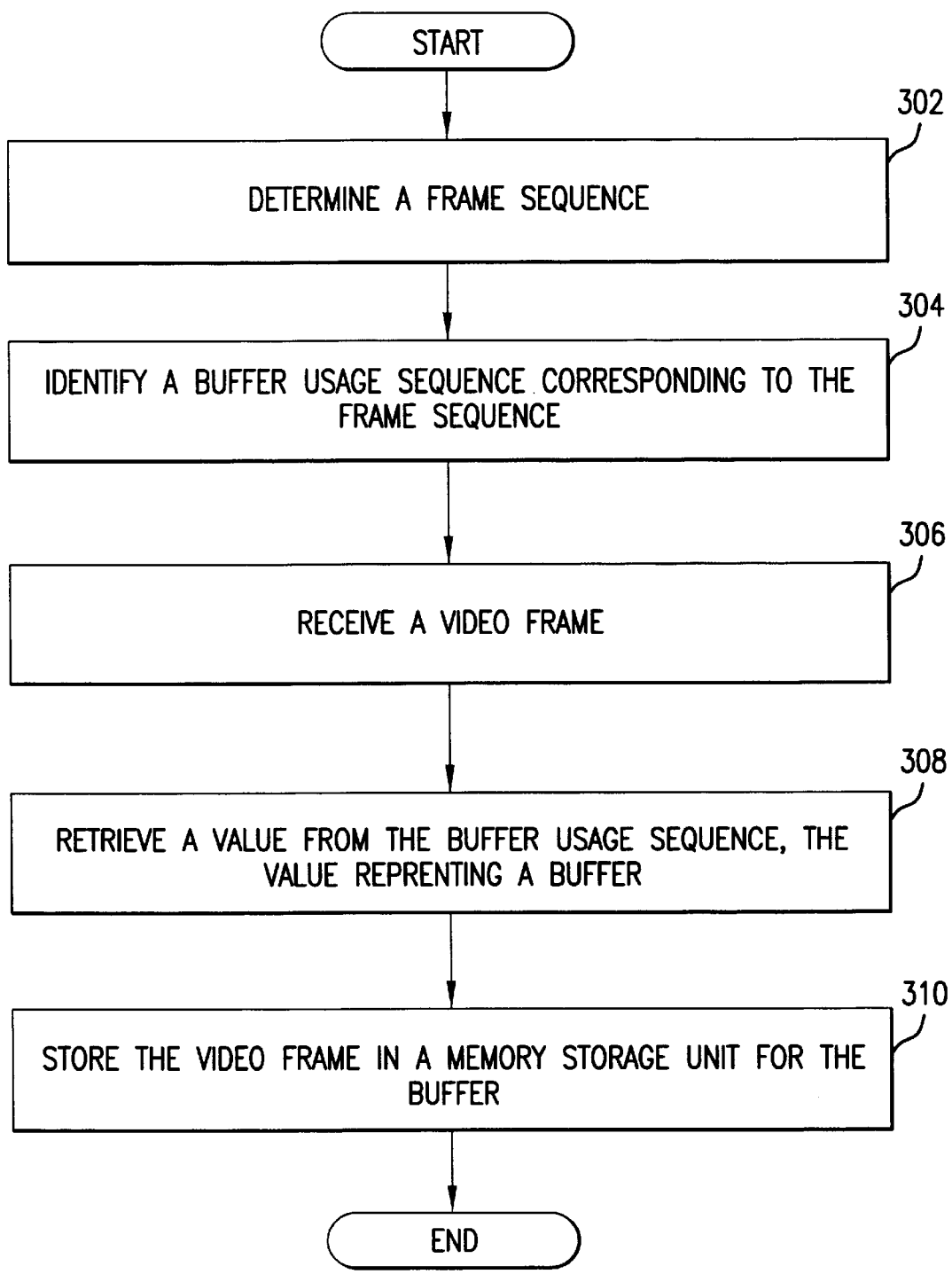
FIG. 3 is a second block flow diagrams of the steps performed by a BMA in accordance with one embodiment of the invention.

FIG. 3 is a second block flow diagrams of the steps performed by a BMA in accordance with one embodiment of the invention. As shown in FIG. 3, a frame sequence is determined for the received frames at step 302. This can be accomplished by encoding system 118 sending the applicable frame sequence prior to sending the actual encoded signals. If the BMA is being used with encoding system 118, the frame sequence can be determined by a user-selected frame rate (e.g., 30 frames per second) and/or key frame interval.

A buffer usage sequence corresponding to the frame sequence is then identified at step 304. A video frame is received at step 306. A value is retrieved from the buffer usage sequence in sequential order, with the value representing a buffer, at step 308. The video frame is then stored in a memory storage unit for the buffer.

The operation of the embodiments of the invention may be better understood using an example. The example will be discussed with reference to FIG. 4.

Figure 4:
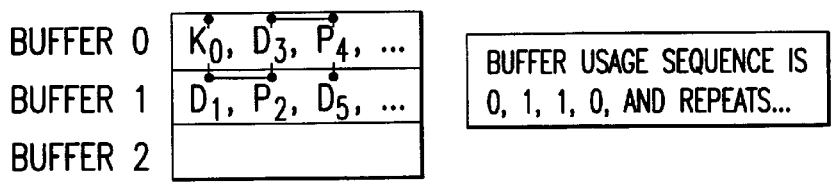
FIG. 4 is a diagram of buffers used in accordance with one embodiment of the invention.
Figure 4:
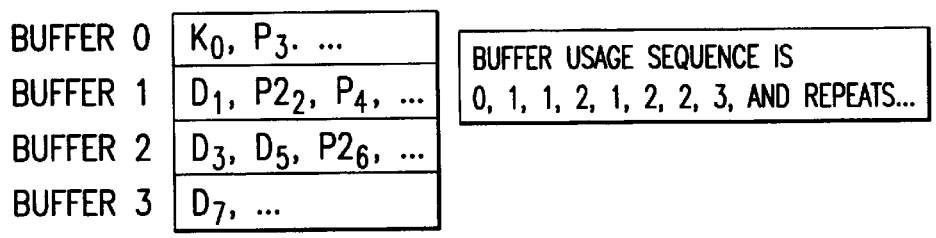
Figure 4:
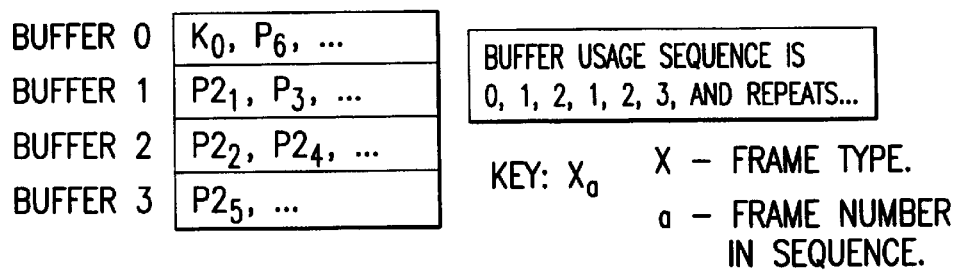

FIG. 4 is a diagram of buffers used in accordance with one embodiment of the invention. As shown in FIG. 4, frame sequence A comprises frame types K, D, P and D. Buffer usage sequence A comprises buffer values 0, 1, 1 and 0. Thus, a first video frame $K_0$ is received and stored in buffer 0 as denoted by the first buffer value of buffer usage sequence A. A second video frame $D_1$ is received and stored in buffer 1 as denoted by the second buffer value of buffer usage sequence A. This continues with frames $P_2$, $D_3$, $P_4$, and $D_5$, in the same manner, as well as with frame sequences B and C and buffer usage sequences B and C, respectively.

It can be appreciated that in our first example using frame sequence and buffer usage sequence A, the second video frame $D_1$ requires the first video frame $K_0$ to be properly decoded. It can also be appreciated that frames $D_1$ and $K_0$ are a predetermined number of memory storage units from one another. Thus, when frame $D_1$ is decoded, decoding system 120 is capable of locating and retrieving frame $K_0$ in a straightforward fashion using the predetermined number.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A memory management method for video data, comprising:

determining a frame sequence from a sequence of video frames;

determining a buffer usage sequence corresponding to the frame sequence, wherein the buffer usage sequence is a sequence of values, each value identifying one of a plurality of buffers and wherein the buffer usage sequence ensures that a video frame which requires a reference frame for decoding is a predetermined number of memory storage units away from the reference frame; and storing the sequence of video frames in the plurality of buffers according to the buffer usage sequence.

2. The method of claim 1, wherein the predetermined number equals the size of a buffer.

* * * * *